(12) United States Patent
Tokoro

(10) Patent No.: US 10,747,166 B2
(45) Date of Patent: Aug. 18, 2020

(54) CLUTCH DEVICE AND IMAGE FORMING APPARATUS

(71) Applicant: Brother Kogyo Kabushiki Kaisha, Nagoya (JP)

(72) Inventor: Yuji Tokoro, Inazawa (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 145 days.

(21) Appl. No.: 16/112,839

(22) Filed: Aug. 27, 2018

(65) Prior Publication Data

US 2019/0072164 A1    Mar. 7, 2019

(30) Foreign Application Priority Data

Sep. 6, 2017 (JP) ................................. 2017-171518

(51) Int. Cl.
*B65H 3/06* (2006.01)
*G03G 21/16* (2006.01)

(52) U.S. Cl.
CPC ....... *G03G 21/1647* (2013.01); *B65H 3/0669* (2013.01); *B65H 2403/421* (2013.01); *B65H 2403/512* (2013.01); *B65H 2403/724* (2013.01)

(58) Field of Classification Search
CPC ............ B65H 3/0669; B65H 2043/421; B65H 2403/512; B65H 2403/514; B65H 2403/724; B65H 1/14; B65H 1/025; G03G 21/1647; G03G 21/1857; G03G 2221/1657
USPC ........................................................ 271/114
See application file for complete search history.

(56) References Cited

U.S. PATENT DOCUMENTS

| | | | | |
|---|---|---|---|---|
| 4,529,188 A | * | 7/1985 | Sturnick | B65H 3/0669 271/10.12 |
| 5,961,112 A | * | 10/1999 | Kim | B65H 3/0669 271/10.05 |
| 7,461,840 B2 | * | 12/2008 | Hattori | B65H 1/14 271/110 |
| 7,637,493 B2 | * | 12/2009 | Ogawa | B65H 3/0669 271/114 |

(Continued)

FOREIGN PATENT DOCUMENTS

| JP | 59039632 A | * | 3/1984 | ............... B65H 1/14 |
|---|---|---|---|---|
| JP | 2007-064343 A | | 3/2007 | |

(Continued)

*Primary Examiner* — Bobby Rushing, Jr.
(74) *Attorney, Agent, or Firm* — Burr & Brown, PLLC

(57) ABSTRACT

A clutch device includes a sector gear, a cam, an electromagnetic solenoid, a first lever, a second lever, a first spring, and a second spring. The cam includes a slide portion. The first lever engages with the electromagnetic solenoid and includes a first restricting portion. The second lever includes a hook and a second restricting portion. The first spring is configured to urge the second lever in a direction in which the first restricting portion and the second restricting portion contact each other. The second spring is configured to, when the electromagnetic solenoid is in a de-energized state, move the first lever. The slide portion of the cam has a surface configured to, when the electromagnetic solenoid is in an energized state, press the hook in a direction opposite to an urging direction of the first spring such that the second restricting portion is separated from the first restricting portion.

9 Claims, 9 Drawing Sheets

(56) References Cited

U.S. PATENT DOCUMENTS

| | | | |
|---|---|---|---|
| 7,708,266 B2 * | 5/2010 | Hirose | B65H 3/0684 271/117 |
| 9,563,165 B2 * | 2/2017 | Nakamura | G03G 15/657 |
| 2013/0237366 A1 | 9/2013 | Yasuda et al. | |
| 2014/0315680 A1 | 10/2014 | Muramatsu et al. | |

FOREIGN PATENT DOCUMENTS

| | | |
|---|---|---|
| JP | 2008-002569 A | 1/2008 |
| JP | 2013-109023 A | 6/2013 |
| JP | 2013-127604 A | 6/2013 |
| JP | 2013-213574 A | 10/2013 |

* cited by examiner

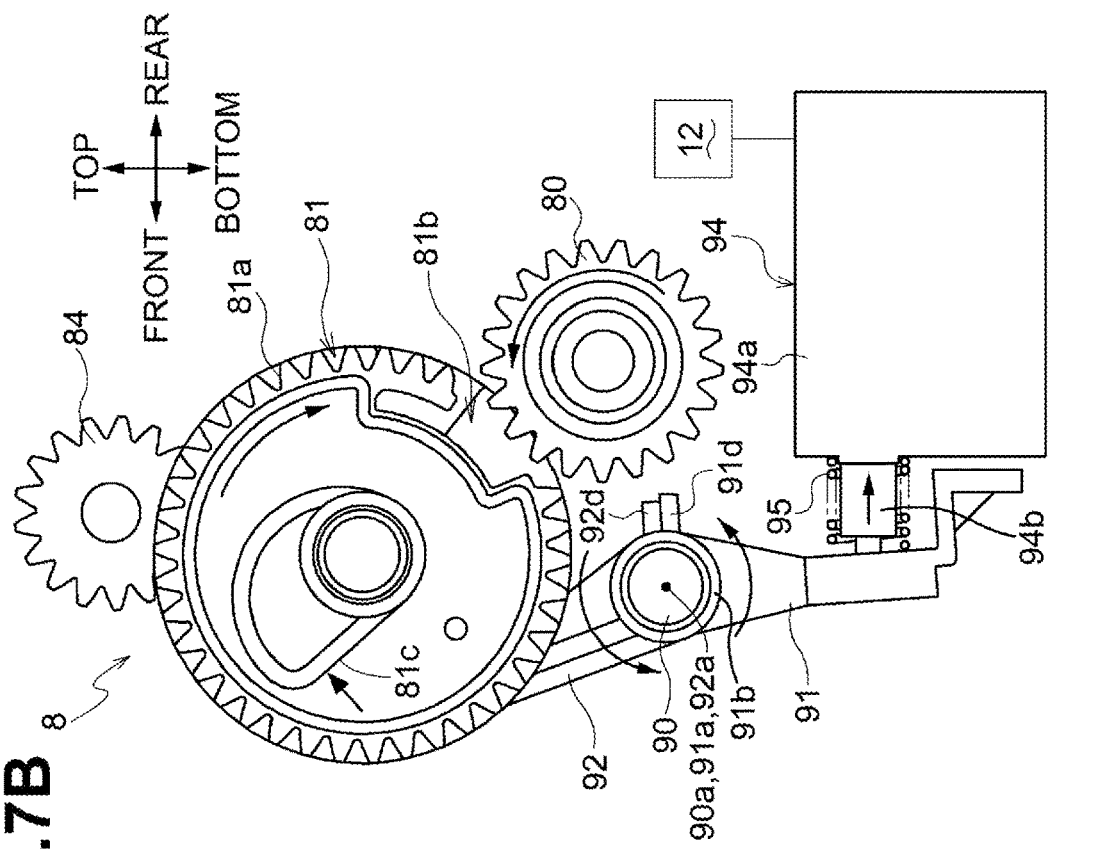
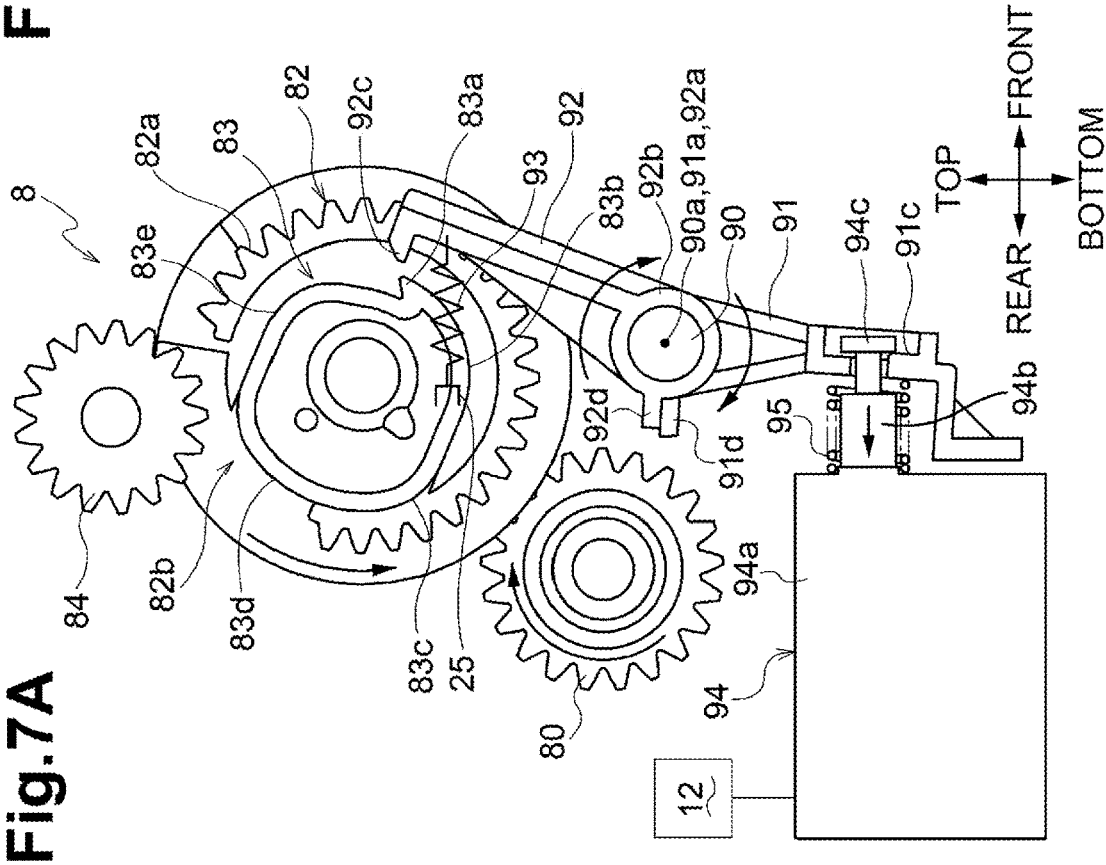

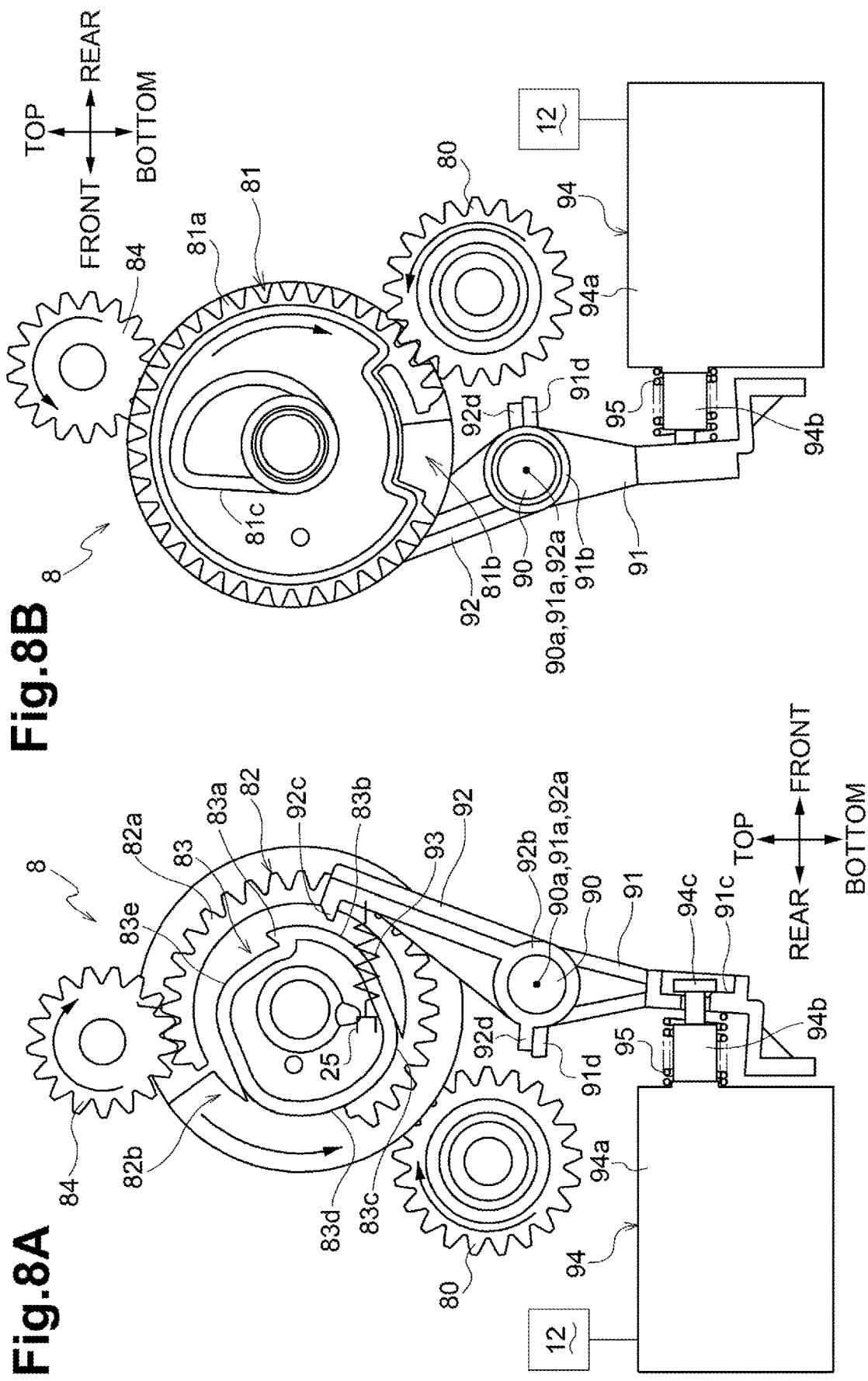

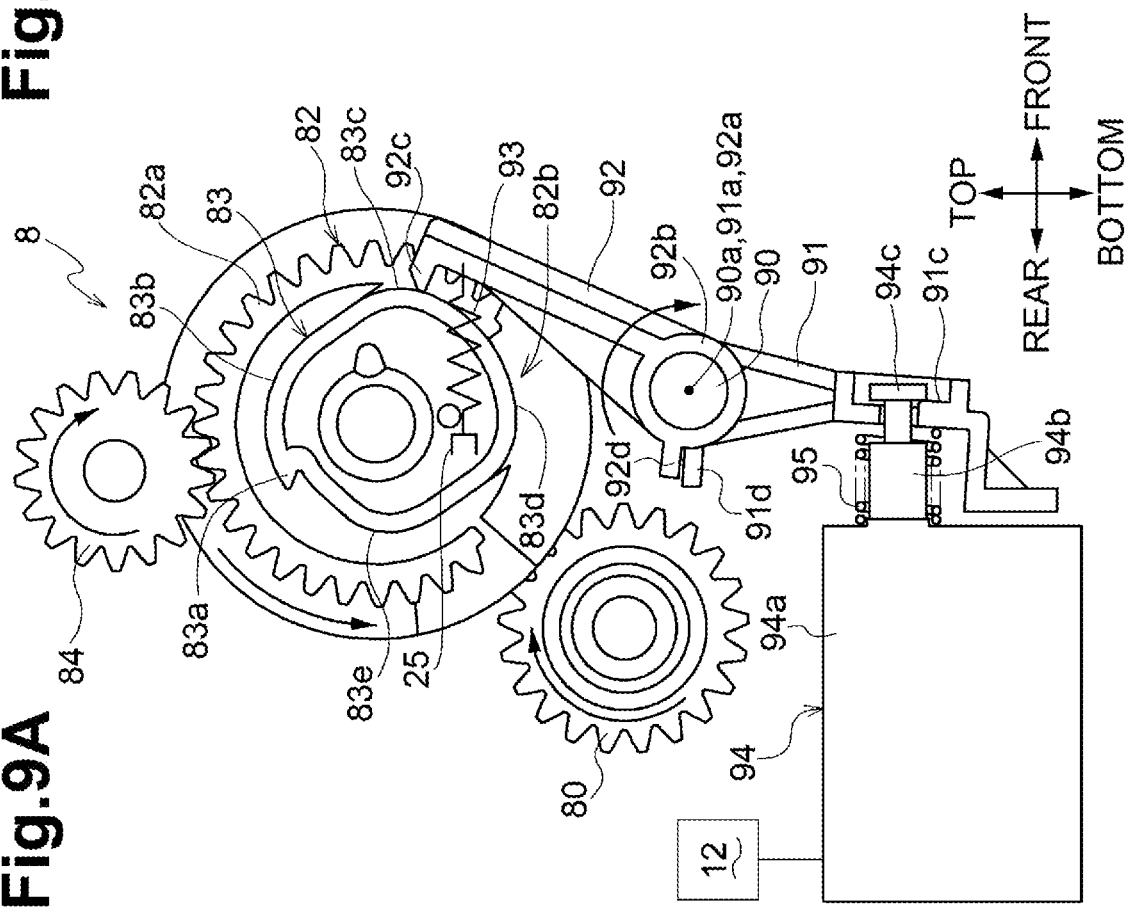

CLUTCH DEVICE AND IMAGE FORMING APPARATUS

CROSS-REFERENCE TO RELATED APPLICATION

This application claims priority from Japanese Patent Application No. 2017-171518 filed on Sep. 6, 2017, the content of which is incorporated herein by reference in its entirety.

TECHNICAL FIELD

Aspects of the disclosure relate to a clutch device configured to intermittently transmit a rotational force to a rotating member and an image forming apparatus including the clutch device.

BACKGROUND

A clutch device that intermittently transmits a rotational force to a rotating member is known. The clutch device includes a gear having a toothless portion, a cam rotatable integrally with the gear and including an engagement portion, an electromagnetic solenoid having an energized state and a de-energized state, a lever, and a spring. The lever includes a hook engageable with the engagement portion. The lever is attracted by the electromagnetic solenoid in the energized state. The spring urges the lever in a direction in which the hook and the engagement portion engage with each other.

The clutch device has an output stop state and an output state. In the output stop state, the electromagnetic solenoid is in the de-energized state, the lever is urged by the spring, and the hook and the engagement portion engage with each other, and rotation of the gear is restricted. In the output state, the lever is attracted by the electromagnetic solenoid in the energized state against the urging force of the spring, the engagement between the hook and the engagement portion is released, and the gear is allowed to rotate. The cam includes a first cam surface downstream from the engagement portion in a direction opposite to a direction of rotation of the cam, and a second cam surface downstream from the first cam surface in the direction opposite to the direction of rotation of the cam. The second cam surface is located in a position where a distance from a center of the cam to the second cam surface is greater than a distance from the center of the cam to the first cam surface.

The clutch device operates as follows.

When the clutch device is in the output stop state where the hook and the engagement portion engage with each other, and the electromagnetic solenoid is switched to the energized state, the lever is attracted by the electromagnetic solenoid and comes into contact with an abutment portion of the electromagnetic solenoid, the hook moves away from the engagement portion, the gear is allowed to rotate, and thus the clutch device enters the output state. When the clutch device is in the output state, the cam rotates together with the gear, and the first cam surface of the cam faces the hook of the lever. The first cam surface is spaced from the hook.

In this state, when the gear further rotates, the second cam surface of the cam faces the hook. The second cam surface contacts the hook, and presses the hook toward the electromagnetic solenoid. The lever, with the hook pressed toward the electromagnetic solenoid by the second cam surface, is configured to pivot, like a seesaw, about the abutment portion of the electromagnetic solenoid against the urging force of the spring.

In this state, the cam rotates with the hook being pressed against the second cam surface by a pressing force of the second cam and the urging force of the spring.

With the hook being pressed against the second cam surface, the clutch device switches the electromagnetic solenoid from the energized state to the de-energized state. Then, the cam rotates with the gear, the hook engages with the engagement portion, and the clutch device enters the output stop state.

The clutch device switches the magnetic solenoid from the energized state to the de-energized state with the hook being pressed against the second cam surface. Thereby, the clutch device prevents an impact noise from occurring when the hook contacts the cam.

SUMMARY

In the above structure, the spring extends twice, when the electromagnetic solenoid is in the energized state, and when the hook is pressed by the second cam surface. When the cam rotates with the hook of the lever being pressed against the second cam surface by the pressing force of the second cam surface and the urging force of the spring, great force acts on the hook and the second cam surface, which may result in wearing of the cam.

Illustrative aspects of the disclosure provide a clutch device configured to reduce pressing force of a lever relative to a cam when the lever and cam contact each other, and an image forming apparatus including the clutch device.

A clutch device according to one aspect of the disclosure is configured to intermittently transmit a rotational force from a drive gear to a rotating member. The clutch device includes a sector gear, a cam, an electromagnetic solenoid, a first lever, a second lever, a first spring, and a second spring. The sector gear includes a toothless portion and is configured to engage with the drive gear. The cam includes an engagement portion and a slide portion. The cam is rotatable integrally with the sector gear. The electromagnetic solenoid has an energized state and a de-energized state. The first lever engages with the electromagnetic solenoid and includes a first restricting portion. The first lever is pivotable about a first axis. The first lever is configured to, when the electromagnetic solenoid is in the energized state, move to a first position. The first lever is configured to, when the electromagnetic solenoid is in the de-energized state, move to a second position different from the first position. The second lever is pivotable about a second axis parallel to the first axis. The second lever includes a hook and a second restricting portion. The hook is configured to, when the electromagnetic solenoid is in the de-energized state, engage with the engagement portion of the cam. The hook is configured to, when the electromagnetic solenoid is in the energized state, separate from the engagement portion and slide on the slide portion of the cam. The second restricting portion is configured to contact or move away from the first restricting portion of the first lever. The second restricting portion is configured to, when the second restricting portion contacts the first restricting portion, restrict movement of the first lever. The first spring is configured to urge the second lever in a direction in which the first restricting portion of the first lever and the second restricting portion of the second lever contact each other. The second spring is configured to, when the electromagnetic solenoid is in the de-energized state, move the first lever to the second position. The slide portion of the cam has a surface configured to, when the electromagnetic solenoid is in the energized state, press the hook of the second lever in a direction opposite to an urging direction of the first spring such that the second restricting portion of the second lever is separated from the first restricting portion of the first lever.

BRIEF DESCRIPTION OF THE DRAWINGS

Aspects of the disclosure are illustrated by way of example and not by limitation in the accompanying figures in which like reference characters indicate similar elements.

FIG. 7A is a left side view of the clutch device, in which the electromagnetic solenoid is switched to the energized state and the engagement between the hook of the second lever and the engagement portion is released.

FIG. 7B is a right side view of the clutch device, in which the electromagnetic solenoid is switched to the energized state and the engagement between the hook of the second lever and the engagement portion is released.

FIG. 8A is a left side view of the clutch device, in which the electromagnetic solenoid is in the energized state and a separation surface of the cam faces the hook of the second lever.

FIG. 8B is a right side view the clutch device, in which the electromagnetic solenoid is in the energized state and the separation surface of the cam faces the hook of the second lever.

FIG. 9A is a left side view of the clutch device, in which the electromagnetic solenoid is in the energized state and a second surface of the cam faces the hook of the second lever.

FIG. 9B is a right side view of the clutch device, in which the electromagnetic solenoid is in the energized state and the second surface of the cam faces the hook of the second lever.

DETAILED DESCRIPTION

An illustrative embodiment of the disclosure will be described with reference to the accompanying drawings.

[Overall Structure of Image Forming Apparatus]

Figure 1:
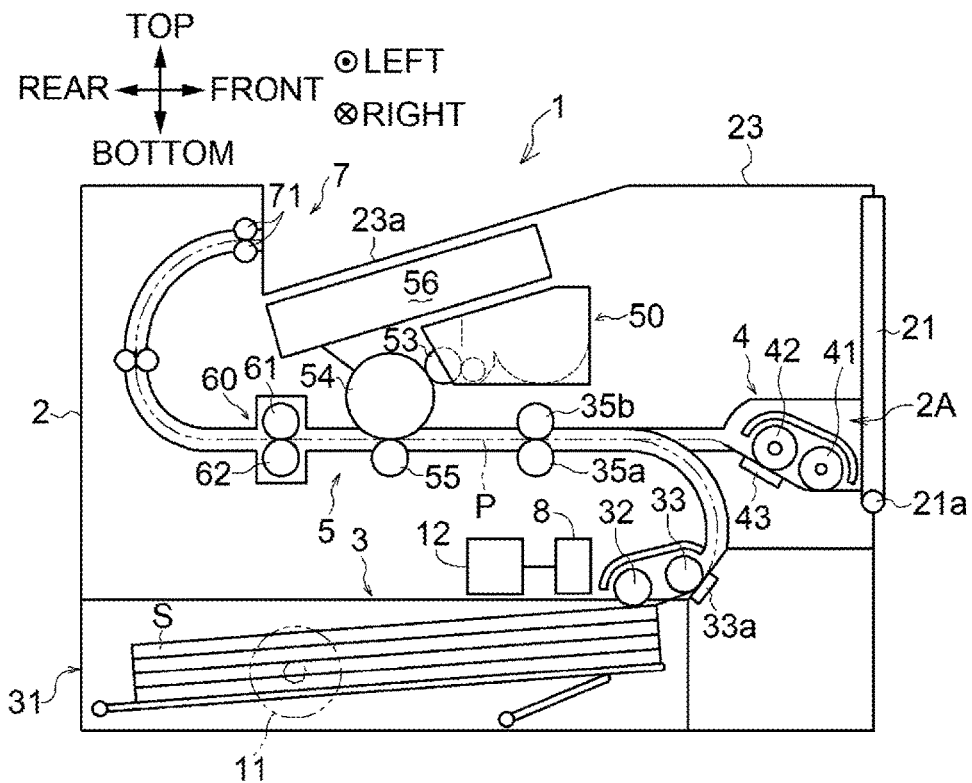
FIG. 1 is a cross sectional view of an image forming apparatus including a clutch device, with a MP tray in a closed position.

An image forming apparatus 1 illustrated in FIG. 1 is an example of an image forming apparatus including a clutch device according to the disclosure. The image forming apparatus 1 includes a casing 2, an image forming unit 5 configured to form an image on a sheet S, a feed unit 3 configured to feed a sheet S to the image forming unit 5, and a motor 11 as a drive source.

In the following description, directions are defined based on FIG. 1. In FIG. 1, a right side is defined as a front or front side of the image forming apparatus 1, a left side is defined as a rear or rear side of the image forming apparatus 1, a side facing out of the page is defined as a left or left side of the image forming apparatus, a side facing into the page is defined as a right or right side of the image forming apparatus 1, an upper side is defined as a top or upper side of the image forming apparatus 1, and a lower side is defined as a bottom or lower side of the image forming apparatus 1.

The casing 2 is box-shaped, and accommodates the feed unit 3, the image forming unit 5, and a discharge unit 7. The casing 2 includes, at its front, an opening 2A and a multi-purpose tray (hereinafter referred to as a MP tray) 21 movable to cover or expose the opening 2A. The casing 2 has an upper surface covered by an upper cover 23.

The MP tray 21 is pivotable about a rotation shaft 21a located in a lower end portion of the MP tray 21 and extending horizontally in the left-right direction. The MP tray 21 is pivotable between a closed position to cover the opening 2A and an open position to expose the opening 2A. The MP tray 21 in the open position is capable of supporting sheets S thereon.

The upper cover 23 defines a discharge tray 23a extending obliquely downward from the front toward the rear recessed diagonally.

The feed unit 3 includes a sheet cassette 31, a feed roller 32, a separation roller 33, a separation pad 33a, registration rollers 35a, 35b, and a clutch device 8. The casing 2 define inside a conveying path P extending from the sheet cassette 31 via the image forming unit 5 to the discharge tray 23a.

The sheet cassette 31 accommodates a stack of sheets S. The feed roller 32 feeds a sheet S to the separation roller 33. The sheet S is singly separated from subsequent sheets S by the separation roller 33 and the separation pad 33a and fed along the conveying path P.

The clutch device 8 is configured to intermittently transmit a drive force from the motor 11 to the feed roller 32 and the separation roller 3. The feed roller 32 and the separation roller 33 rotate upon receipt of the drive force transmitted via the clutch device 8 from the motor 11, and feed the sheet S along the conveying path P.

The sheet S fed along the conveying path P is conveyed toward the image forming unit 5 by registration rollers 35a, 35b disposed downstream from the separation roller 33 in the conveying path P. The registration rollers 35a, 35b temporarily stop movement of a leading edge of the sheet S and then convey the sheet S toward a transfer position in the image forming unit 5 at a predetermined timing.

The image forming unit 5 is disposed above the sheet cassette 31, and includes a process cartridge 50 configured to transfer an image on a sheet S conveyed from the feed unit 3, an exposure unit 56 configured to expose a surface of a photosensitive drum 54 of the process cartridge 50, and a fixing unit 60 configured to fix the image transferred on the sheet S by the process cartridge 50.

The process cartridge 50 includes a developing roller 53, the photosensitive drum 54, and a transfer roller 55.

The exposure unit 56 includes a laser diode, a polygon mirror, a lens, and a reflecting mirror, and is configured to expose a surface of the photosensitive drum 54 by the irradiation of a laser beam based on image data inputted in the image forming apparatus 1.

The photosensitive drum 54 is disposed adjacent to the developing roller 53. The surface of the photosensitive drum 54 is positively and uniformly charged by a charger (not illustrated), and then exposed by the exposure unit 56. Exposed areas on the surface of the photosensitive drum 54 are lower in electric potential than the other areas thereon, so that an electrostatic latent image is formed on the surface of the photosensitive drum 54 based on the image data.

The developing roller 53 supplies positively charged toner to the surface of the photosensitive drum 54 on which the latent image is formed, thus resulting in a visible developer or toner image.

The transfer roller 55 is disposed facing the photosensitive drum 54, and receives a negative transfer bias from a bias applying member (not illustrated). When a sheet S is nipped at a transfer position between the transfer roller 55 receiving the transfer bias and the photosensitive drum 54 carrying the toner image thereon, the toner image on the photosensitive drum 54 is transferred to the sheet S.

The fixing unit 60 includes a heat roller 61 and a pressure roller 62. The heat roller 61 is driven by a drive force from the motor 11 and is heated by electric power supplied from a power source (not illustrated). The pressure roller 62 is disposed in contact with the heat roller 61, and rotated by the rotation of the heat roller 61. The sheet S having the toner image is conveyed to the fixing unit 60, in which the sheet is nipped and conveyed by the heat roller 61 and the pressure roller 62, and the toner image is fixed onto the sheet S.

The discharge unit 7 includes discharge rollers 71, 71, and is configured to discharge a sheet S conveyed from the fixing unit 60 outside of the casing 2. More specifically, the discharge unit 7 is configured to use the discharge rollers 71, 71 to discharge the sheet S conveyed from the fixing unit 60 to the discharge tray 23a defined by the upper cover 23.

Figure 2:
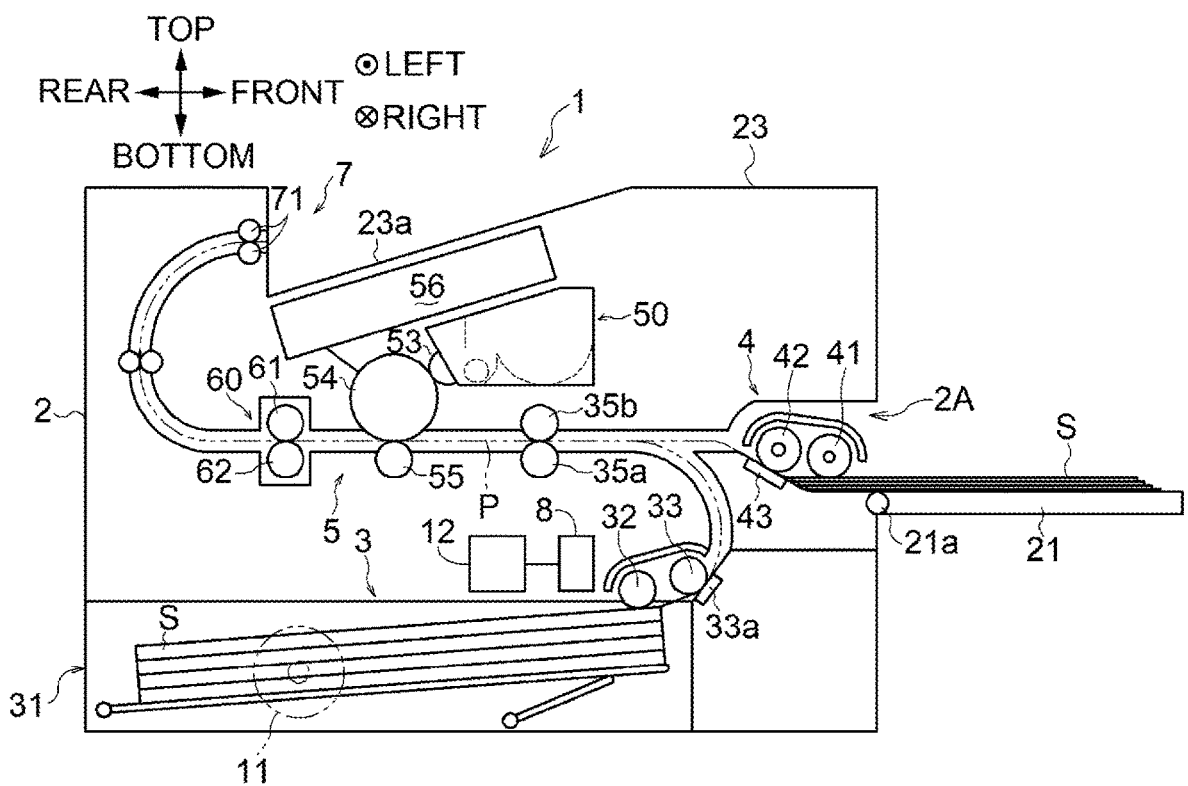
FIG. 2 is a cross sectional view of the image forming apparatus including the clutch device, with the MP tray in an open position.

As illustrated in FIG. 2, a feeder 4 is disposed proximate to the opening 2A of the casing, and configured to feed a sheet S supported on the MP tray 21 in the open position toward the image forming unit 5. The feeder 4 includes a feed roller 41 configured to feed a sheet S, a separation roller 42 disposed downstream from the feed roller 41 in a conveying direction in which the sheet S is conveyed, and a separation pad 43 disposed facing the separation roller 42. The feed roller 41 and the separation roller 42 are driven by a drive force from the motor 11.

Some of the sheets S supported on the MP tray 21 are fed by the feed roller 41 toward the separation roller 42, are separated one by one by the separation roller 42 and the separation pad 43, and then a single sheet S is conveyed along the conveying path P. The sheet S is conveyed along the conveying path P toward the image forming unit 5, by the registration rollers 35a, 35b.

[First Embodiment of Clutch Device]

Next, a first embodiment of the clutch device 8 will be described.

Figure 3A:
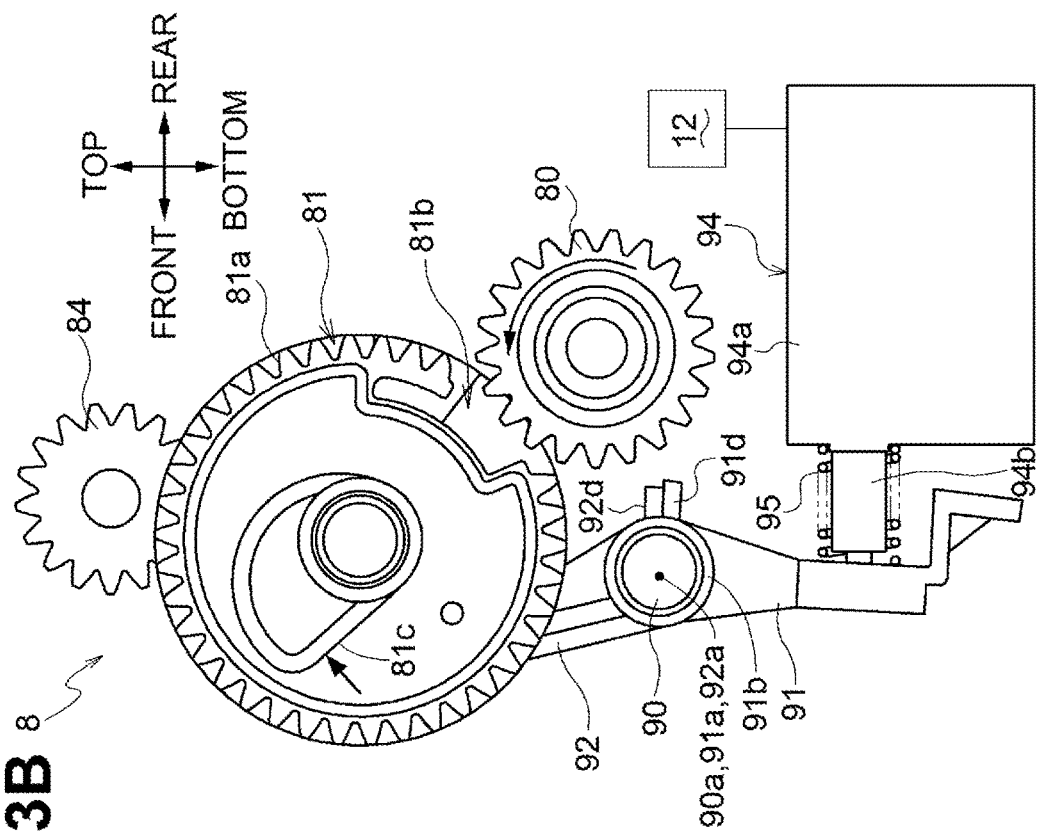
FIG. 3A is a left side view of a clutch device according to a first embodiment, in which a hook of a second lever engages with an engagement portion of a cam.
Figure 3B:
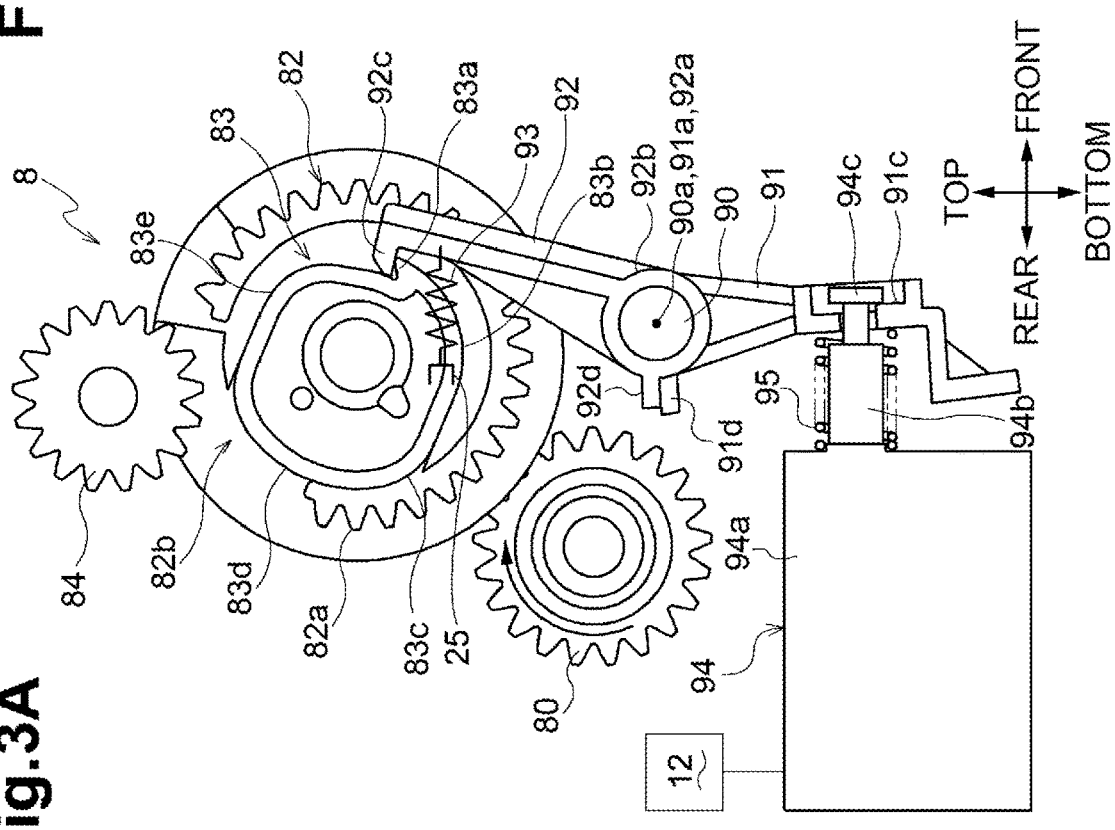
FIG. 3B is a right side view of the clutch device, in which the hook of the second lever engages with the engagement portion of the cam.

As illustrated in FIGS. 3A and 3B, the image forming apparatus 1 includes a drive gear 80 driven by a drive force from the motor 11, and an output gear 84 for outputting the drive force to the feed roller 32 and the separation roller 33. The clutch device 8 is disposed between the drive gear 80 and the output gear 84. The clutch device 8 is configured to intermittently transmit a rotational force from the drive gear 80 to the output gear 84, which is a rotating member. The rotational force transmitted to the output gear 84 is transmitted to the feed roller 32 and the separation roller 33.

The clutch device 8 includes a first sector gear 81, a second sector gear 82, a cam 83, a first lever 91, a second lever 92, a first spring 93, a second spring 95, and an electromagnetic solenoid 94.

The first sector gear 81 includes a first gear portion 81a having gear teeth engageable with the drive gear 80, and a first toothless portion 81b having no gear teeth. The first sector gear 81 is an example of a sector gear engageable with the drive gear 80.

When the first gear portion 81a of the first sector gear 81 faces the drive gear 80, the first gear portion 81a engages with the drive gear 80 driven by a drive force from the motor 11, and a rotational force from the drive gear 80 is transmitted to the first sector gear 81. When the first toothless portion 81b of the first sector gear 81 faces the drive gear 80, the first gear portion 81a does not engage with the drive gear 80, a rotational force from the drive gear 80 is not transmitted to the first sector gear 81.

The first sector gear 81 includes a drive cam 81c, which is rotatable together with the first sector gear 81. The drive cam 81c is urged by an urging member (not illustrated) in a direction in which the first sector gear 81 rotates (or a clockwise direction indicated by an arrow near the drive cam 81c in FIG. 3B).

The second sector gear 82 includes a second gear portion 82a having gear teeth engageable with the output gear 84, and a second toothless portion 82b having no gear teeth. The second sector gear 82 is rotatable together with the first sector gear 81. Thus, when a rotational force from the drive gear 80 is transmitted to the first sector gear 81, the first sector gear 81 and the second sector gear 82 rotate together.

When the second gear portion 82a of the second sector gear 82 faces the output gear 84, the second gear portion 82a engages with the output gear 84, a rotational force of the second sector gear 82 is transmitted to the output gear 84. When the second toothless portion 82b of the second sector gear 82 faces the output gear 84, the second gear portion 82a does not engage with the output gear 84, a rotational force of the second sector gear 82 is not transmitted to the output gear 84.

The electromagnetic solenoid 94 includes a solenoid body 94a and a plunger 94b movably protruding from the solenoid body 94b. The electromagnetic solenoid 94 has an energized state and a de-energized state. The image forming apparatus 1 includes a controller 12 configured to control switching of the electromagnetic solenoid 94 between the energized state and the de-energized state. The controller 12 and the electromagnetic solenoid 94 are connected to each other.

When the electromagnetic solenoid 94 is in the energized state, the plunger 94b is sucked or retracted by an electromagnetic force generated in the solenoid body 94a. When the electromagnetic solenoid 94 is in the de-energized state, the plunger 94b is extended without an electromagnetic force generated in the solenoid body 94a. The plunger 94b includes an engagement portion 94, which is engageable with the first lever 91.

Figure 4:
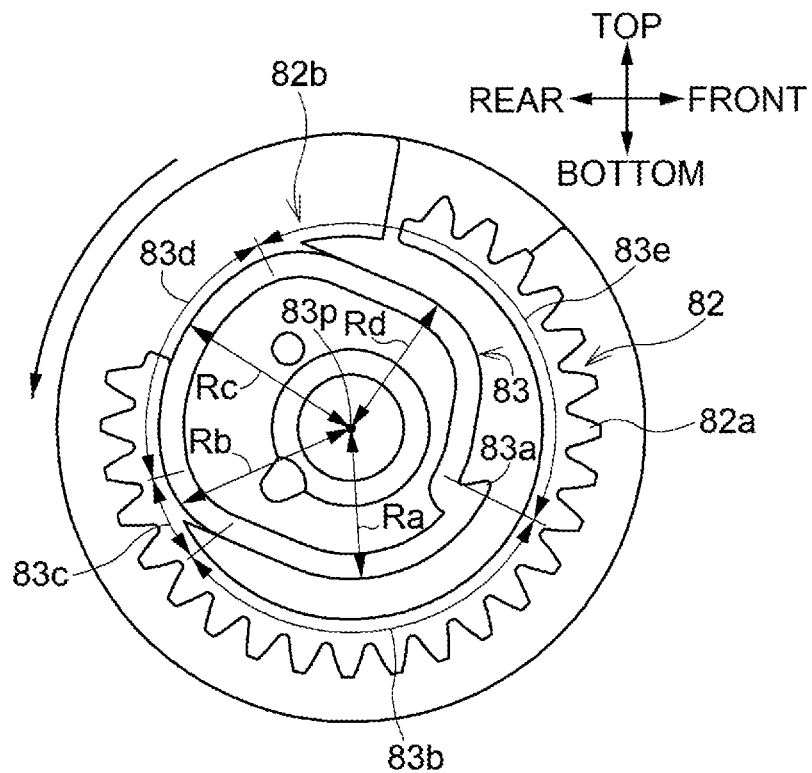
FIG. 4 is a side view illustrating the cam of the clutch device.

As illustrated in FIGS. 3A, 3B, and 4, the cam 83 includes an engagement portion 83a, a separation surface 83b, a first surface 83c, a second surface 83d, and a third surface 83e. The cam 83 is rotatable about a rotation axis 83p together with the first sector gear 81 and the second sector gear 82. The engagement portion 83a, the separation surface 83b, the first surface 83c, the second surface 83d, and the third surface 83e define a cam surface of the cam 83.

The separation surface 83*b* is located downstream from the engagement portion 83*a* in a direction opposite to a direction of rotation of the cam 83 (or in a clockwise direction in FIG. 4). The first surface 83*c* is located downstream from the separation surface 83*b* in the direction opposite to the direction of rotation of the cam 83. The second surface 83*d* is located downstream from the first surface 83*c* in the direction opposite to direction of rotation of the cam 83. The third surface 83*e* is located downstream from the second surface 83*d* in the direction opposite to the direction of rotation of the cam 83.

The first surface 83*c* is located in a position such that a distance Rb from the rotation axis 83*p* to the first surface 83*c* is greater than a distance Ra from the rotation axis 83*p* to the separation surface 83*b*. The second surface 83*d* is located in a position such that a distance Rc from the rotation axis 83*p* to the second surface 83*d* is greater than the distance Rb from the rotation axis 83*p* to the first surface 83*c*. The third surface 83*e* is shaped such that a distance Rd from the rotation axis 83*p* to the third surface 83*e* gradually decreases the farther the third surface 83*e* becomes from the second surface 83*d* in the direction opposite to the direction of rotation of the cam 83.

Figure 5:
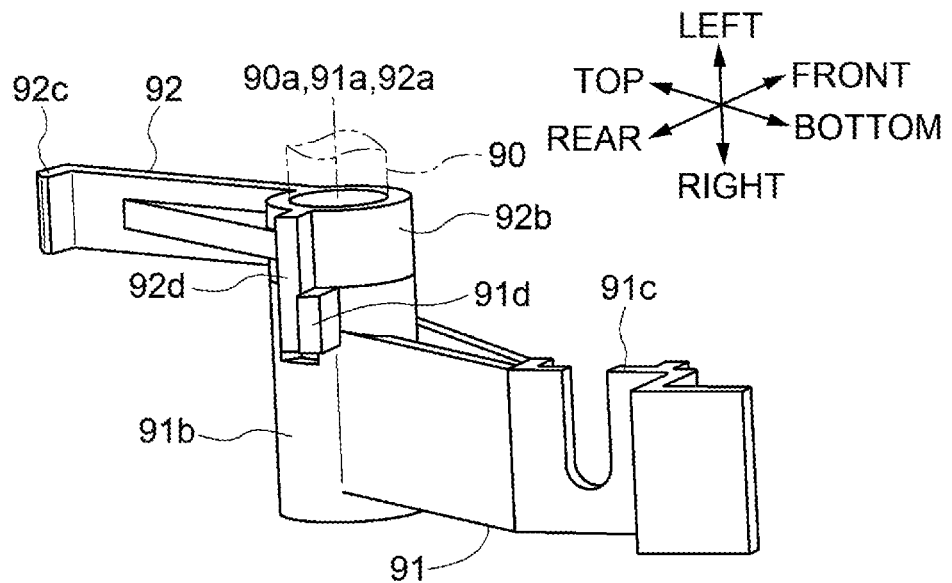
FIG. 5 is a perspective view illustrating a first lever and the second lever, which are supported by a support shaft.
Figure 6:
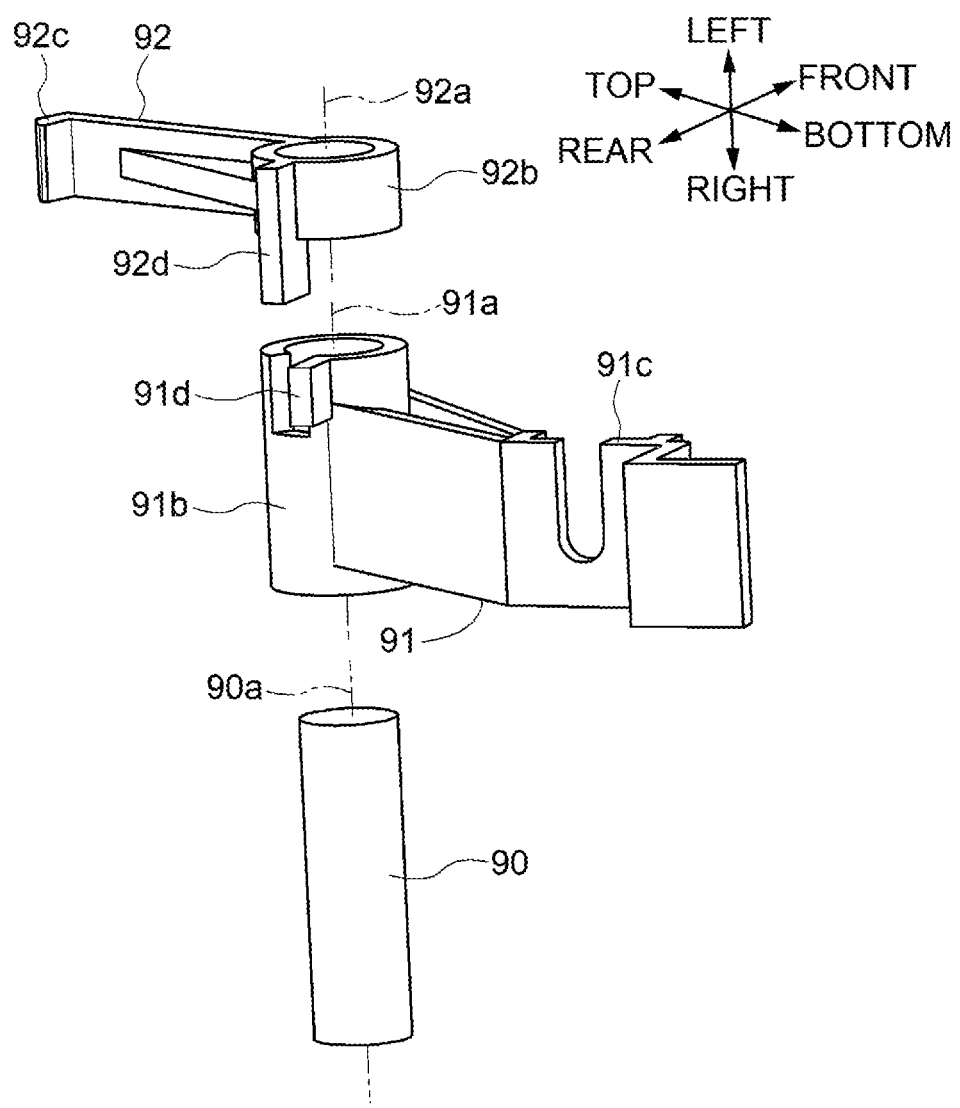
FIG. 6 is an exploded perspective view of the support shaft, the first lever, and the second lever.

As illustrated in FIGS. 5 and 6, the first lever 91 includes a support portion 91*b*, an engagement portion 91*c*, and a first restricting portion 91*d*. The support portion 91*b* is supported by a support shaft 90. The engagement portion 91*c* is engageable with the engagement portion 94*c* of the plunger 94*b* of the electromagnetic solenoid 94. The first lever 91 is pivotable about a first axis 91*a*. The first axis 91*a*, which is a center of pivotal movement of the first lever 91, is coaxial with an axis 90*a* of the support shaft 90. The first restricting portion 91*d* is a protrusion protruding radially from an outer surface of the support portion 91*b*. The engagement portion 91*c* and the first restricting portion 91*d* are integrally rotatable with the support portion 91*b*. The engagement portion 91*c* is a place where the first lever 91 engages with the electromagnetic solenoid 94.

The first lever 91 is configured to, when the electromagnetic solenoid 94 is in the energized state, move to a first position (FIG. 7), and, configured to, when the electromagnetic solenoid 94 is in the de-energized state, move to a second position (FIG. 3).

In other words, when the electromagnetic solenoid 94 enters the energized state and the plunger 94*b* is retracted, the engagement portion 94*c* of the plunger 94*b* engages with the engagement portion 91*c* of the first lever 91, and the first lever 91 rotates in a direction in which the engagement portion 91*c* moves toward the solenoid body 94*a*, and is located in the first position.

The second spring 95 is disposed between the engagement portion 91*c* of the first lever 91 and the solenoid body 94*a* of the electromagnetic solenoid 94. The second spring 95 is a compression spring. When the electromagnetic solenoid 94 is in the de-energized state and the plunger 94*b* is extended, the first lever 91 rotates in a direction in which the engagement portion 91*c* moves away from the solenoid body 94*a* by an urging force of the second spring 95, and is located in the second position.

The second spring 95 is configured to, when the electromagnetic solenoid 94 is in the de-energized state, move the first lever 91 to the second position. The second position is a position in which the engagement portion 91*c*, which rotates in the direction away from the solenoid body 94*a* by an urging force of the second spring 95, engages with the engagement portion 94*c* of the plunger 94*b*.

The second lever 92 includes a support portion 92*b*, a hook 92*c*, a second restricting portion 92*d*. The support portion 92*b* is rotatably supported by the support shaft 90. The hook 92*c* is engageable with the engagement portion 83*a* of the cam 83. The second lever 92 is pivotable about a second axis 92*a*, which is parallel to the first axis 91*a*. The second axis 92*a*, which is a center of pivotal movement of the second lever 92, is coaxial with the axis 90*a* of the support shaft 90. The second axis 92*a* is coaxial with the first axis 91*a*.

As the second axis 92*a* and the first axis 91*a* are coaxial with each other, the second lever 92 and the first lever 91 are supported by the support shaft 90. This simplifies the structure of the clutch device 8.

The second restricting portion 92*d* is a protrusion protruding radially from an outer surface of the support portion 92*b*. The second restricting portion 92*d* is capable of contacting the first restricting portion 91*d* of the first lever 91. The second restricting portion 92*d* is configured to, when the second restricting portion 92*d* contacts the first restricting portion 91*d*, restricts movement of the second lever 92 relative to the first lever 91 in a direction in which the second restricting portion 92*d* contacts the first restricting portion 91*d*.

The second lever 92 is urged by the first spring 93 in a direction in which the first restricting portion 91*d* and the second restricting portion 92*d* contact each other. The first spring 93 is configured to urge the second lever 92 in the direction in which the first restricting portion 91*d* and the second restricting portion 92*d* contact each other. The urging force of the first spring 93 is smaller than the urging force of the second spring 95.

The first spring 93 is an extension spring disposed between a spring support portion 25 of the casing 2 and a portion, between the support portion 92*b* and the hook 92*c*, of the second lever 92. The first spring 93 may be a torsion spring disposed between the first lever 91 and the second lever 92.

When the electromagnetic solenoid 94 is in the de-energized state, the second lever 92 moves in a direction in which the hook 92*c* moves toward the cam 83 by an urging force of the first spring 93, the hook 92*c* engages with the engagement portion 83*a* of the cam 83. More specifically, as illustrated in FIG. 3A, when the electromagnetic solenoid 94 is in the de-energized state and the engagement portion 83*a* of the cam 83 faces the hook 92*c*, the hook 92*c* engages with the engagement portion 83*a*.

When the electromagnetic solenoid 94 is in the energized state, the first lever 91 moves to the first position, the first restricting portion 91*d* and the second restricting portion 92*d* contact each other, the second lever 92 moves in a direction in which the hook 92*c* moves away from the cam 83 against the urging force of the first spring 93.

In an example illustrated in FIG. 3A, the electromagnetic solenoid 94 is in the de-energized state, and the hook 92*c* of the second lever 92 engages with the engagement portion 83*a* of the cam 83. In this state, when the electromagnetic solenoid 94 is switched to the energized state, as illustrated in FIG. 7, the first lever 91 moves from the second position to the first position, and thus the first restricting portion 91*d* and the second restricting portion 92*d* contact each other. This causes the second lever 92 to move until the hook 92*c* moves away from the cam 83 or the engagement between the hook 92*c* and the engagement portion 83*a* is released.

In the above case where the engagement portion 83*a* of the cam 83 faces the hook 92*c*, when the electromagnetic solenoid 94 is in the de-energized state, the engagement portion 83a of the cam 83 engages with the hook 92c of the second lever 92. When the electromagnetic solenoid 94 is in the energized state, the engagement between the engagement portion 83a of the cam 83 and the hook 92c of the second lever 92 is released.

The clutch device 8 is structured such that, in a state where the hook 92c engages with the engagement portion 83a; when the electromagnetic solenoid 94 is switched to the de-energized state, the first lever 91 moves from the second position to the first position; and when the electromagnetic solenoid 94 is switched to the energized state, the first restricting portion 91d and the second restricting portion 92d contact each other, and the hook 92c moves to a position in which the engagement between the hook 92c and the engagement portion 83a is released.

The clutch device 8 includes the first lever 94 and the second lever 92. The first lever 94 engages with the electromagnetic solenoid 94, and the second lever 92 includes the hook 92c engageable with the engagement portion 83a. This simple structure enables releasing of the engagement between the hook 92c and the engagement portion 83a when the electromagnetic solenoid 94 is switched to the energized state.

In a case where the separation surface 83b of the cam 83 faces the hook 92c, when the electromagnetic solenoid 94 is in the de-energized state, the second lever 92 is urged by the first spring 93 in the direction toward the cam 83, the hook 92c contacts the separation surface 83b. As illustrated in FIG. 8, when the electromagnetic solenoid 94 is in the energized state, the second lever 92 moves in the direction away from the cam 83 against the urging force of the first spring 93, and the hook 92c is spaced from the separation surface 83b.

In a case where the first surface 83c of the cam 83 faces the hook 92c, when the electromagnetic solenoid 94 is in the de-energized state, the second lever 92 is urged by the first spring 93 in the direction toward the cam 83, and the hook 92c contacts the first surface 83c. When the electromagnetic solenoid 94 is in the energized state, the second lever 92 moves in the direction away from the cam 83 against the urging force of the first spring 93. However, the hook 92c contacts the first surface 83c since the distance Rb from the rotation axis 83p to the first surface 83c is greater than the distance Ra from the rotation axis 83p to the separation surface 83b.

In a case where the second surface 83d of the cam 83 faces the hook 92c, when the electromagnetic solenoid 94 is in the de-energized state, the second lever 92 is urged by the first spring 93 in the direction toward the cam 83, and the hook 92c contacts the second surface 83d. As illustrated in FIG. 9, when the electromagnetic solenoid 94 is in the energized state, the second lever 92 moves in the direction away from the cam 83 against the urging force of the first spring 93. However, the hook 92c contacts the second surface 83d since the distance Rc from the rotation axis 83p to the second surface 83d is greater than the distance Rb from the rotation axis 83p to the first surface 83c.

In this state, the hook 92c is pressed by the second surface 83d in a direction opposite to an urging direction of the first spring 93 in which the urging force of the first spring 93 is directed, to separate the second restricting portion 92d from the first restricting portion 91d. In other words, the second surface 83d of the cam 83 is an example of a cam surface configured to, when the electromagnetic solenoid 94 is in the energized state, press the hook 92c of the second lever 92 in the direction opposite to the urging direction of the first spring 93 such that the second restricting portion 92d of the second lever 92 is separated from the first restricting portion 91d of the first lever 91.

The first surface 83c and the second surface 83d of the cam 83 constitute a slide portion on which, when the electromagnetic solenoid 94 is in the energized state, the hook 92c of the second lever 92 slides. In other words, when the cam 83 rotates with the electromagnetic solenoid 94 in the energized state, the hook 92c of the second lever 92 slides on the first surface 83c and the second surface 83d of the cam 83.

In a case where the third surface 83e of the cam 83 faces the hook 92c, when the electromagnetic solenoid 94 is in the de-energized state, the second lever 92 is urged by the first spring 93 in the direction toward the cam 83, and the hook 92c contacts the third surface 83e.

[Operation of the Clutch Device]

Next, operation of the clutch device 8 will be described.

As illustrated in FIG. 3A, the hook 92c engages with the engagement portion 83a of the cam 83, and the electromagnetic solenoid 94 is in the de-energized state. In this state, the cam 83 is urged in the direction of its rotation (or in a counterclockwise direction in FIG. 3A) by an urging member that urges the drive cam 81c of the first sector gear 81. However, as the hook 92c engages with the engagement portion 83a, the rotation of the cam 83 is blocked, and the cam 83 is thus stopped.

When the hook 92c engages with the engagement portion 83a, the first toothless portion 81b of the first sector gear 81 faces the drive gear 80, and a rotational force from the drive gear 80 is not transmitted to the first sector gear 81.

When the hook 92c engages with the engagement portion 83a, the second toothless portion 82b of the second sector gear 82 faces the output gear 84, the second gear portion 82a does not engage with the output gear 84, and the output gear 84 stops or outputs nothing.

In this state, when the electromagnetic solenoid 94 is switched to the energized state, as illustrated in FIG. 7, the first lever 91 moves from the second position to the first position, and the first restricting portion 91d and the second restricting portion 92d contact each other. The second lever 92 thus moves in the direction in which the hook 92c moves away from the cam 83, and the engagement between the engagement between the hook 92c and the engagement portion 83a is released.

When the electromagnetic solenoid 94 is switched to the energized state and the engagement between the hook 92c and the engagement portion 83a is released, the cam 83 is allowed to rotate, and the cam 83 starts rotating by an urging force of the urging member that urges the drive cam 81c.

When the cam 83 rotates, the first sector gear 81 accordingly rotates from a position where the first toothless portion 81b faces the drive gear 80 to a position where the first gear portion 81a faces the drive gear 80, the drive gear 80 engages with the first gear portion 81a, and a rotational force from the drive gear 80 is transmitted to the first sector gear 81. In other words, driving of the first sector gear 81 switches from the urging member that urges the drive cam 81c to the drive gear 80.

Then, as illustrated in FIG. 8A, the second sector gear 82, which rotates together with the first sector gear 81, rotates from a position where the second toothless portion 82b faces the output gear 84 to a position where the second gear portion 82a faces the output gear 84, the second gear portion 82a engages with the output gear 84. The engagement between the second gear portion 82a and the output gear 84 causes the second sector gear 83 to start transmitting its rotation force to the output gear 84, resulting in the output gear 84 rotating.

As illustrated in FIG. 8A, when the second gear portion 82a of the second sector gear 82 starts engaging with the output gear 84, the separation surface 83b of the cam 83 faces the hook 92c, and the hook 92c and the separation surface 83b are spaced apart from each other.

In this state, when the cam 83 further rotates, the first surface 83c of the cam 83 faces the hook 92c, and the first surface 83c contacts the hook 92c.

The separation surface 83b and the first surface 83c are connected smoothly, forming a curved surface. When the electromagnetic solenoid 94 is in the energized state, the first surface 83c comes into contact with the hook 92c. This structure reduces impact noise resulting from the first surface 83c and the hook 92c contacting each other. Especially at a boundary between the separation surface 83b and the first surface 83c, a distance from the rotation axis 83p of the cam 83 to a cam surface (the separation surface 83b and the first surface 83c) gradually increases the farther downstream the cam surface is in the direction opposite to the direction of rotation of the cam 83. This effectively reduces impact noise resulting from the first surface 83c and the hook 92c contacting each other.

When the cam 38 further rotates with the hook 92c contacting the first surface 83c, as illustrated in FIG. 9A, the second surface 83d of the cam 83 faces the hook 92c, and the hook 92c contacts the second surface 83d.

As the second surface 83d is located in a position such that the distance Rc from the rotation axis 83p of the cam 83 to the second surface 83d is greater than the distance Rb from the rotation axis 83p of the cam 83 to the first surface 83c, the second surface 83d presses the hook 92c of the second lever 92 in an opposite direction to an urging direction of the first spring 93 such that the second restricting portion 92d is away from the first restricting portion 91d, and the second lever 92 thus moves in the direction away from the cam 83.

Accordingly, when the hook 92c is in contact with the second surface 83d, the hook 92c is pressed against the second surface 83d by the urging force of the first spring 93. This enables the hook 92c to maintain stable contact with the second surface 83d.

The urging force of the first spring 93 is smaller than the urging force of the second spring 95. Thus, the hook 92c does not contact the second surface 83d with excessive pressure. This reduces a pressing force of the hook 92c against the second surface 83d, and thus saves wearing of the second surface 83d.

The clutch device 8 thus includes the first spring 93 and the second spring 95, which are separately disposed, with the urging force of the first spring 93 being smaller than the urging force of the second spring 95. This reduces the pressing force of the hook 92c against the first surface 83c and the second surface 83d, which are the slide portion of the cam 83, and thus saves wearing of the cam 83.

Figure 10B:
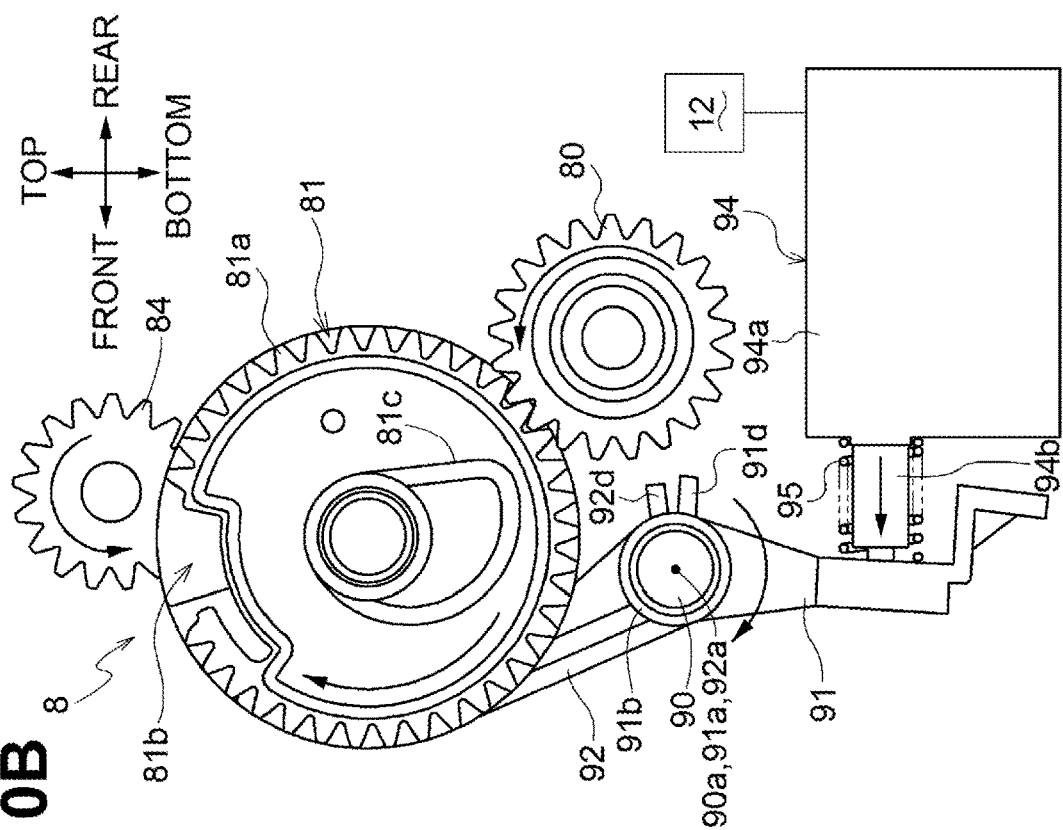
FIG. 10B is a right side view of the clutch device, in which, with the hook of the second lever contacting the second surface of the cam, the electromagnetic solenoid is switched from the energized state to the de-energized state.
Figure 10A:
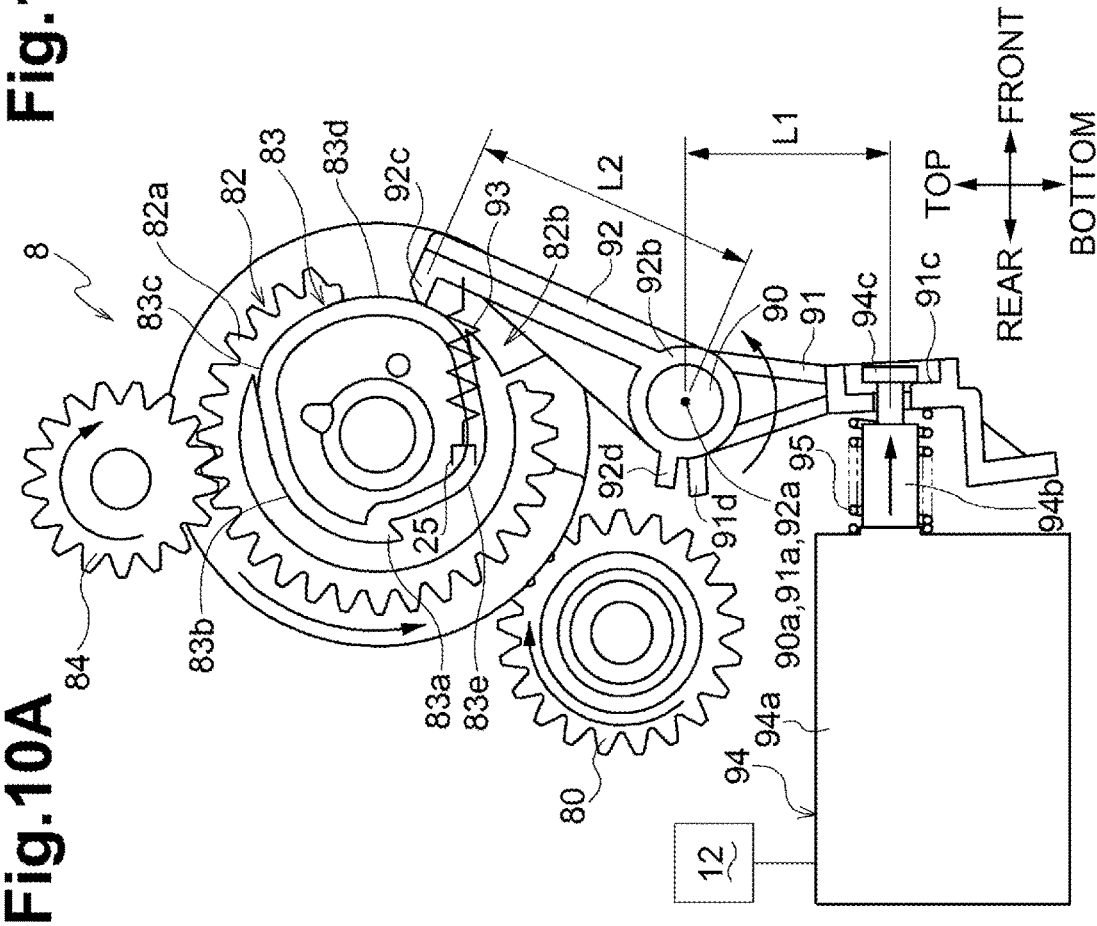
FIG. 10A is a left side view of the clutch device, in which, with the hook of the second lever contacting the second surface of the cam, the electromagnetic solenoid is switched from the energized state to the de-energized state.

The clutch device 8 is structured such that, when the hook 92c of the second lever 92 is in contact with the second surface 83d of the cam 83, as illustrated in FIG. 10A, the electromagnetic solenoid 94 is controlled by the controller 12 to be switched from the energized state to the de-energized state.

When the electromagnetic solenoid 94 is switched from the energized state to the de-energized state, the first lever 91 moves from the first position to the second position, and the first restricting portion 91d moves away from the second restricting portion 92d.

When the electromagnetic solenoid 94 is switched from the energized state to the de-energized state and the first lever 91 moves to the second position, the hook 92c of the second lever 92 maintains contact with the second surface 83d of the cam 83.

In other words, the hook 92c is in contact with the second surface 83d before the electromagnetic solenoid 94 is switched from the energized state to the de-energized state. When the electromagnetic solenoid 94 is switched from the energized state to the de-energized state, the hook 92c does not separate from and re-contact the second surface 83d. This prevents an impact noise from occurring when the second surface 83d and the hook 92 contact each other.

The urging force of the first spring 93 is smaller than the urging force of the second spring 95. When the electromagnetic solenoid 94 is switched from the energized state to the de-energized state, the urging force of the second spring 95 moves the first lever 91 to the second spring 95 reliably.

As illustrated in FIG. 10A, the clutch device 8 is structured such that a length L2 from the second axis 92a of the second lever 92, which is urged by the first spring 93 in the direction toward the cam 83, to the hook 92c is greater than a length L1 from the first axis 91a of the first lever 91 to a position in which the first lever 91 engages with the engagement portion 94c of the plunger 94b of the electromagnetic solenoid 94.

This reduces the pressing force of the hook 92c against the cam 83, which is caused by an urging torque acting on the second lever 92, and thus saves wearing of the cam 83.

When the cam 83 further rotates with the hook 92c contacting the second surface 83d, the third surface 83e of the cam 83 contacts the hook 92c.

The third surface 83e is shaped such that a distance Rd from the rotation axis 83p to the third surface 83e gradually decreases the farther downstream the third surface 83e is in the direction opposite to the direction of rotation of the cam 83. When the cam 83 rotates with the hook 92c contacting the third surface 83e, the second lever 92 having the hook 92c to slide on the third surface 83e of the rotating cam 83 is urged by the urging force of the first spring 93 and moves in a direction in which the second restricting portion 92d and the first restricting portion 91d are close to each other.

The distance Rd from the rotation axis 83p to the third surface 83e gradually decreases the farther downstream the third surface 83e is in the direction opposite to the direction of rotation of the cam 83. When the cam 83 rotates, the second lever 92 does not suddenly move in the direction in which the first restricting portion 91d and the second restricting portion 92d contact each other. This prevents an impact noise from occurring when the first restricting portion 91d and the second restricting portion 92d contact each other.

The third surface 83e is shaped such that the distance Rd from the rotation axis 83p of the cam 83 to the third surface 83e gradually decreases the farther downstream the third surface 83e is in the direction opposite to the direction of rotation of the cam 83. In other words, the third surface 83e is shaped such that a first velocity with which the second lever 92 is moved, by an urging force of the first spring 93, in the direction in which the first restricting portion 91d of the first lever 91 and the second restricting portion 92d of the second lever 92 contact each other, is greater than a second velocity with which, when the cam 83 rotates, the second lever 92 contacting the third surface 83e moves in a direction in which the first restricting portion 91d of the first lever 91 and the second restricting portion 92d of the second lever 92 contact each other.

When the cam 83 rotates with the hook 92c contacting the third surface 83e, a downstream end portion of the third surface 83e of the cam 83 faces the hook 92c. The second sector gear 82 rotates from a position where the second gear portion 82a faces the output gear 84 to a position where the second toothless portion 82b faces the output gear 84, and a rotational force of the second sector gear 82 is not transmitted to the output gear 84.

The first sector gear 81 rotates from a position where the first gear portion 81a faces the drive gear 80 to a position where the first toothless portion 81b faces the drive gear 80, and a rotational force from the drive gear 80 is not transmitted to the first sector gear 81.

When a rotational force from the drive gear 80 is not transmitted to the first sector gear 81, the cam 83 continues rotating due to the urging force of the urging member that urges the drive cam 81c.

The cam 83, which is rotated by the urging member that urges the drive cam 81c, reaches a position where the engagement portion 83a faces the hook 92c as illustrated in FIG. 3A, and stops rotating by engagement between the hook 92c and the engagement portion 83a.

[Second Embodiment of Clutch Device]

Figure 11:
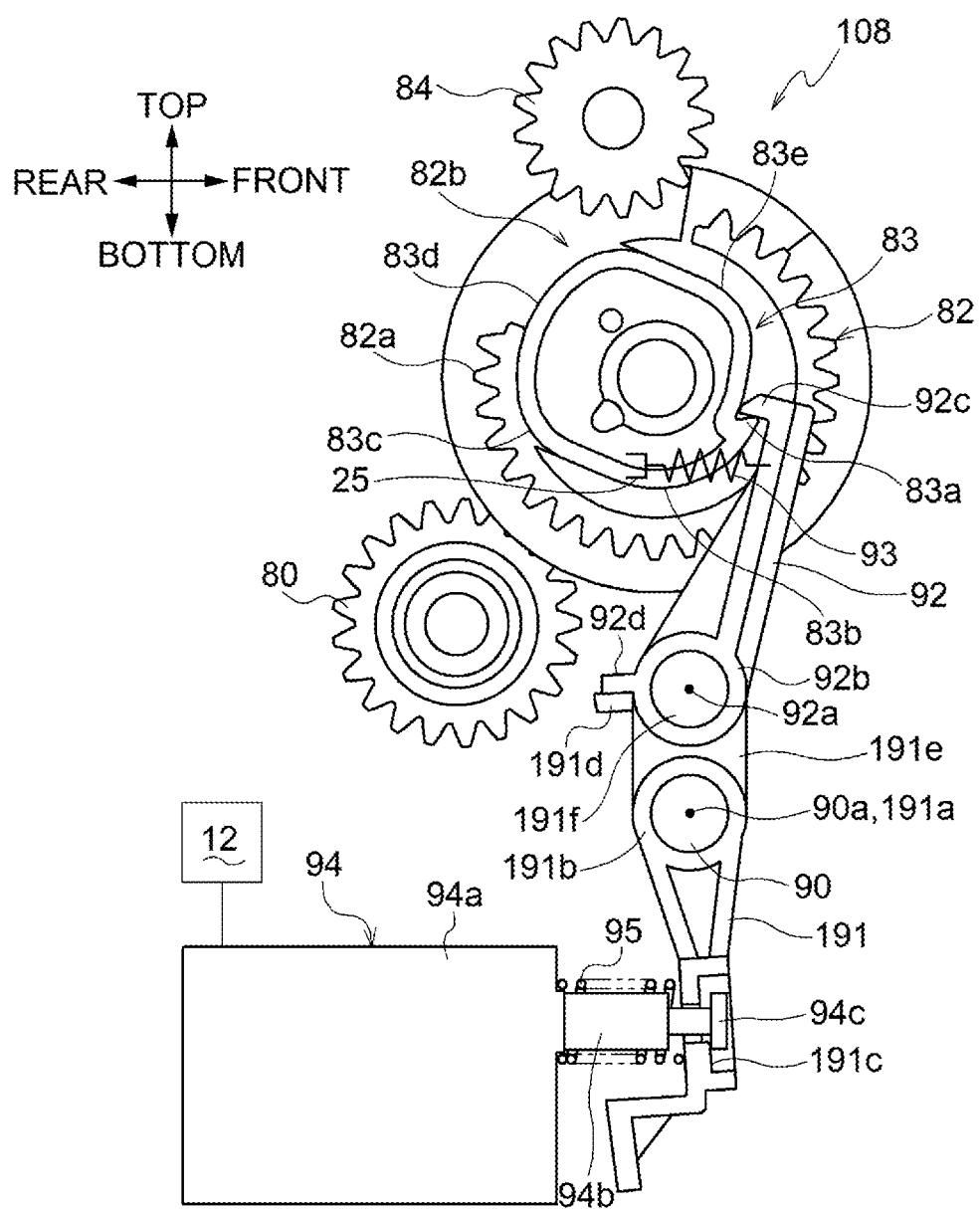
FIG. 11 is a side view of a clutch device according to a second embodiment.

Alternatively, the clutch device 8 may be structured as follows:

As illustrated in FIG. 11, a clutch device 108 of this embodiment is different from the clutch device 8 of the first embodiment in that a first axis 191a which is a center of pivotal movement of a first lever 191 is not coaxial with a second axis 92a which is a center of pivotal movement of a second lever 92.

The first lever 191 of the clutch device 108 includes a support portion 191b, an engagement portion 191c, an extension portion 191e, a second lever support portion 191f, and a first restricting portion 191d. The first lever 191 is pivotable about the first axis 191a.

The support portion 191b is rotatably supported by the support shaft 90. The support portion 191b is engageable with the engagement portion 94c of the plunger 94b of the electromagnetic solenoid 94. The extension portion 191e extends from the support portion 191b to a side opposite to the engagement portion 191c. The second lever support portion 191f is located in the extension portion 191e and supports the second lever 92 rotatably. The first restricting portion 191d is a protrusion protruding radially from an outer surface of the extension portion 191e. The engagement portion 191c, the extension portion 191e, the second lever support portion 191f, and the first restricting portion 191d are rotatable integrally with the support portion 191b.

The second lever 92 includes the support portion 92b rotatably supported by the second lever support portion 191f, and is pivotable about the second axis 92a.

The support portion 191b of the first lever 191 is supported by the support shaft 90. The axis 90a of the support shaft 90 is not coaxial with an axis of the second lever support portion 191f that supports the support portion 92b of the second lever 92. In other words, the first axis 191a of the first lever 191 and the second axis 92a of the second lever 92 are located on different axes.

The other elements of the first lever 191 are similar to those of the first lever 91 of the first embodiment, and thus their description will be omitted for the sake of brevity. The other elements of the second lever 92 are similar to those of the first embodiment, and thus their description will be omitted for the sake of brevity.

The clutch device 108 includes the first sector gear 81, the second sector gear 82, the cam 83, the electromagnetic solenoid 94, the first spring 93, and the second spring 95, which are similar to those of the first embodiment. Thus, their description will be omitted for the sake of brevity.

The second embodiment shows that the first axis 191a of the first lever 191 is not coaxial with the second axis 92a of the second lever 92. In the second embodiment, the urging force of the first spring 93 is smaller than the urging force of the second spring 95 as in the first embodiment. This reduces the pressing force of the hook 92c against the slide portion of the cam 83 including the first surface 83c and the second surface 83d, and thus saves wearing of the cam 83.

[Effects in the Embodiments]

In the above embodiments, the image forming apparatus 1 includes the clutch device 8, 108 described as follows.

The clutch device 8, 108 is configured to intermittently transmit the rotational force from the drive gear 80 to the output gear 84, and includes the first sector gear 81, the cam 83, the electromagnetic solenoid 94, the first lever 91, 191, the second lever 92, the first spring 93, and the second spring 95.

The first sector gear 81 includes the first toothless portion 81b, and is engageable with the drive gear 80. The cam 83 includes the engagement portion 83a and the slide portion which is the first surface 83c and the second surface 83d. The cam 83 is rotatable integrally with the first sector gear 81. The electromagnetic solenoid 94 can be switched between the energized state and the de-energized state. The first lever 91, 191 engages with the electromagnetic solenoid 94, and is pivotable about the first axis 91a, 191a. The first lever 91, 191 moves to the first position when the electromagnetic solenoid 94 is in the energized state. The first lever 91, 191 moves to the second position when the electromagnetic solenoid 94 is in the de-energized state. The first lever 91, 191 includes the first restricting portion 91d, 191d. The second lever 92 includes the hook 92c and the second restricting portion 92d. When the electromagnetic solenoid 94 is in the de-energized state, the hook 92c engages with the engagement portion 83a of the cam 83. When the electromagnetic solenoid 94 is in the energized state, the hook 92c moves away from the engagement portion 83a and is slidable on the first surface 83c and the second surface 83d, which are the slide portion of the cam 83. The second restricting portion 92d is configured to contact or move away from the first restricting portion 91d, 191d of the first lever 91, 191. The second restricting portion 92d is configured to contact the first restricting portion 91d, 191d to restrict movement of the second lever 92 relative to the first lever 91, 191. The second lever 92 is pivotable about the second axis 92a, which is parallel to the first axis 91a, 191a.

The first spring 93 urges the second lever 92 in the direction in which the first restricting portion 91d, 191d of the first lever 91, 191 and the second restricting portion 92d of the second lever 92 contact each other. The second spring 95 moves the first lever 91, 191 to the second position when the electromagnetic solenoid 94 is in the de-energized state.

The second surface 83d constitutes a part of the slide portion of the cam 83. The second surface 83d is configured to, when the electromagnetic solenoid 94 is in the energized state, press the hook 92c of the second lever 92 in the direction opposite to the urging direction of the first spring 93 such that the second restricting portion 92d of the second lever 92 is separated from the first restricting portion 91d, 191d of the first lever 91, 191.

The clutch device 8 thus includes the first spring 93 and the second spring 95, which are separately disposed, with the urging force of the first spring 93 being smaller than the urging force of the second spring 95. This reduces the pressing force of the hook 92*c* against the slide portion of the cam 83, which is the first surface 83*c* and the second surface 83*d*, and thus saves wearing of the cam 83.

The first axis 91*a* of the first lever 91 is coaxial with the second axis 92*a* of the second lever 92.

This enables the second lever 92 and the first lever 91 to be supported by the support shaft 90, thus simplifying the structure of the clutch device 8. the clutch device 8.

The slide portion of the cam 83 includes the first surface 83*c* and the second surface 83*d*. When the electromagnetic solenoid 94 is in the energized state, the first surface 83*c* and the second surface 83*d* come into contact with the hook 92*c* of the second lever 92. The second surface 83*d* is located downstream from the first surface 83*c* in the direction opposite to the direction of rotation of the cam 83 and located in a position such that the distance from the rotation axis 83*p* of the cam 83 to the second surface 83*d* is greater than the distance from the rotation axis 83*p* of the cam 83 to the first surface 83*c*.

When the electromagnetic solenoid 94 is in the energized state, the first surface 83*c* comes into contact with the hook 92*c*. This prevents an impact noise from occurring when the first surface 83*c* comes into contact with the hook 92*c*. This also enables the hook 92*c* to maintain stable contact with the second surface 83*d*.

The clutch device 8, 108 includes the controller 12 configured to control switching of the electromagnetic solenoid 94 between the energized state and the de-energized state. The controller 12 switches the electromagnetic solenoid 94 from the energized state to the de-energized state with the hook 92*c* of the second lever 92 contacting the second surface 83*d* of the cam 83.

This prevents an impact noise from occurring when the second surface 83*d* and the hook 92*c* contact each other.

The cam 83 includes the third surface 83*e* located downstream from the second surface 83*d* in the direction opposite to the direction of rotation of the cam 83. The third surface 83*e* is shaped such that the distance Rd from the rotation axis 83*p* of the cam 83 to the third surface 83*e* gradually decreases the farther the third surface 83*e* becomes from the second surface 83*d* in the direction opposite to the direction of rotation of the cam 83.

When the cam 83 rotates, the second lever 92 does not suddenly move in the direction in which the first restricting portion 91*d* and the second restricting portion 92*d* contact each other. This prevents an impact noise from occurring when the first restricting portion 91*d* and the second restricting portion 92*d* contact each other.

In a case where the electromagnetic solenoid 94 is in the de-energized state and the hook 92*c* of the second lever 92 engages with the engagement portion 83*a* of the cam 83, when the electromagnetic solenoid 94 is switched to the energized state, the first lever 91, 191 moves from the second position to the first position, the first restricting portion 91*d*, 191*d* and the second restricting portion 92*d* contact each other, the hook 92*c* of the second lever 92 moves away from the engagement portion 83*a* of the cam 83.

The clutch device 8 includes the first lever 91 and the second lever 92. This simple structure enables releasing of the engagement between the hook 92*c* of the second lever 92 and the engagement portion 83*a* of the cam 83 when the electromagnetic solenoid 94 is switched to the energized state.

The second lever 92 having the length L2 from the second axis 92*a* to the hook 92*c* is greater than the first lever 91, 191 having a distance from the first axis 91*a*, 191*a* to the engagement portion 91*c*, 191*c* at which the first lever 91, 191 engages with the electromagnetic solenoid 94.

This reduces the pressing force of the hook 92*c* against the cam 83, and thus saves wearing of the cam 83.

The above embodiments show but are not limited to the clutch device for transmitting a rotational force to the feed roller and the separation roller in the feed unit of the image forming apparatus. The clutch device may transmit a rotational force to a feed roller and a separation roller in a sheet feeding apparatus for conveying sheets supported on a MP tray of the image forming apparatus.

What is claimed is:

1. A clutch device configured to intermittently transmit a rotational force from a drive gear to a rotating member, the clutch device comprising:
    a sector gear including a toothless portion, the sector gear being configured to engage with the drive gear;
    a cam including an engagement portion and a slide portion, the cam being rotatable integrally with the sector gear;
    an electromagnetic solenoid having an energized state and a de-energized state;
    a first lever engaging with the electromagnetic solenoid and including a first restricting portion, the first lever being pivotable about a first axis, the first lever being configured to, when the electromagnetic solenoid is in the energized state, move to a first position, the first lever being configured to, when the electromagnetic solenoid is in the de-energized state, move to a second position different from the first position;
    a second lever pivotable about a second axis parallel to the first axis, the second lever including:
        a hook configured to, when the electromagnetic solenoid is in the de-energized state, engage with the engagement portion of the cam, the hook being configured to, when the electromagnetic solenoid is in the energized state, separate from the engagement portion and slide on the slide portion of the cam; and
        a second restricting portion configured to contact or move away from the first restricting portion of the first lever, the second restricting portion being configured to, when the second restricting portion contacts the first restricting portion, restrict movement of the first lever;
    a first spring configured to urge the second lever in a direction in which the first restricting portion of the first lever and the second restricting portion of the second lever contact each other; and
    a second spring configured to, when the electromagnetic solenoid is in the de-energized state, move the first lever to the second position,
    wherein the slide portion of the cam has a surface configured to, when the electromagnetic solenoid is in the energized state, press the hook of the second lever in a direction opposite to an urging direction of the first spring such that the second restricting portion of the second lever is separated from the first restricting portion of the first lever.

2. The clutch device according to claim 1, wherein an urging force of the first spring is smaller than an urging force of the second spring.

3. The clutch device according to claim 1, wherein the first axis and the second axis are coaxial with each other.

4. The clutch device according to claim 1,
wherein the slide portion of the cam includes:
a first surface configured to, when the electromagnetic solenoid is in the energized state, contact the hook of the second lever; and
a second surface located downstream from the first surface in a direction opposite to a direction of rotation of the cam, and
wherein the second surface is located in a position such that a distance from an axis of the cam to the second surface is greater than a distance from the axis of the cam to the first surface.

5. The clutch device according to claim 4, further comprising a controller configured to control switching of the electromagnetic solenoid between the energized state and the de-energized state,
wherein the controller is configured to, when the hook of the second lever is in contact with the second surface of the cam, switch the electromagnetic solenoid from the energized state to the de-energized state.

6. The clutch device according to claim 4,
wherein the cam includes a third surface located downstream from the second surface in the direction opposite to the direction of rotation of the cam, and
wherein the third surface is shaped such that a distance from the axis of the cam to the third surface gradually decreases the farther the third surface becomes from the second surface in the direction opposite to the direction of rotation of the cam.

7. The clutch device according to claim 1, wherein, when the hook of the second lever engages with the engagement portion of the cam and the electromagnetic solenoid is switched from the de-energized state to the energized state, the first lever moves from the second position to the first position, the first restricting portion and the second restricting portion contact each other, and the hook of the second lever moves away from the hook of the second lever.

8. The clutch device according to claim 1,
wherein the first lever has a first length from the first axis of the first lever to a position in which the first lever engages with the electromagnetic solenoid, and
wherein the second lever has a second length from the second axis of the second lever to the hook, the second length being greater than the first length.

9. An image forming apparatus comprising:
the clutch device according to claim 1.

* * * * *